(12) United States Patent
McCandless

(10) Patent No.: US 6,666,468 B2
(45) Date of Patent: Dec. 23, 2003

(54) CONVERTIBLE BICYCLE

(76) Inventor: William R. McCandless, P.O. Box 667, Connellsville, PA (US) 15425

(*) Notice: Subject to any disclaimer, the term of this patent is extended or adjusted under 35 U.S.C. 154(b) by 49 days.

(21) Appl. No.: 10/041,452

(22) Filed: Jan. 10, 2002

(65) Prior Publication Data

US 2003/0127821 A1 Jul. 10, 2003

(51) Int. Cl.[7] .............................................. B62K 13/06

(52) U.S. Cl. ...................................... 280/209; 280/7.16

(58) Field of Search ................................. 280/7.1, 7.16, 280/209, 222, 231, 282

(56) References Cited

U.S. PATENT DOCUMENTS

| | | | | |
|---|---|---|---|---|
| 707,122 | A | * 8/1902 | Kynaston | 280/209 |
| 1,522,039 | A | * 1/1925 | Swearinger | 280/209 |
| 3,592,486 | A | * 7/1971 | Fox | 280/209 |
| 3,865,401 | A | 2/1975 | Kingsly | |
| 4,288,089 | A | 9/1981 | Thiessen | |
| 4,834,410 | A | * 5/1989 | Parker | 280/209 |
| 5,511,809 | A | 4/1996 | Sagi | |
| 6,022,036 | A | 2/2000 | Chartrand | |
| 6,068,278 | A | 5/2000 | Kock et al. | |

OTHER PUBLICATIONS

Selene Sport & Selene Bug Advertisement (Unknown).
Performance Bicycle, Catalog Advertisement, Sep. 2001.
Bike Nashbar Advertisement, Mid Summer 2001, Catalog 159.

* cited by examiner

Primary Examiner—Lesley D. Morris
Assistant Examiner—Matthew Luby
(74) Attorney, Agent, or Firm—Hoffman, Wasson & Gitler

(57) ABSTRACT

A device for connecting two bicycles to one another in a side-by-side relationship allows two riders to simultaneously use the bicycle and not have the view blocked by a rider directly in front of them. A steering bar insures that the front wheels of both bicycles are always pointed in the same direction so that, when connected, the joined bicycles both head in the same direction. Additional bars are connected between the two bicycles to provide a rigid connection between the bicycles. The rigid connection insures that both bicycles travel at the same speed. If one rider causes one of the bicycles to move faster, the acceleration and speed of the first bicycle will be transferred to the second bicycle due to the rigid connection. For all intents and purposes, when joined, the two bicycles act as a single vehicle. The connection between the bicycles can be easily disassembled so that each bicycle can be used separately. The flexibility of using both bicycles separately or together is advantageous in such situations as bicycle rentals. Bicycles can be joined or separated as the demand dictates.

10 Claims, 6 Drawing Sheets

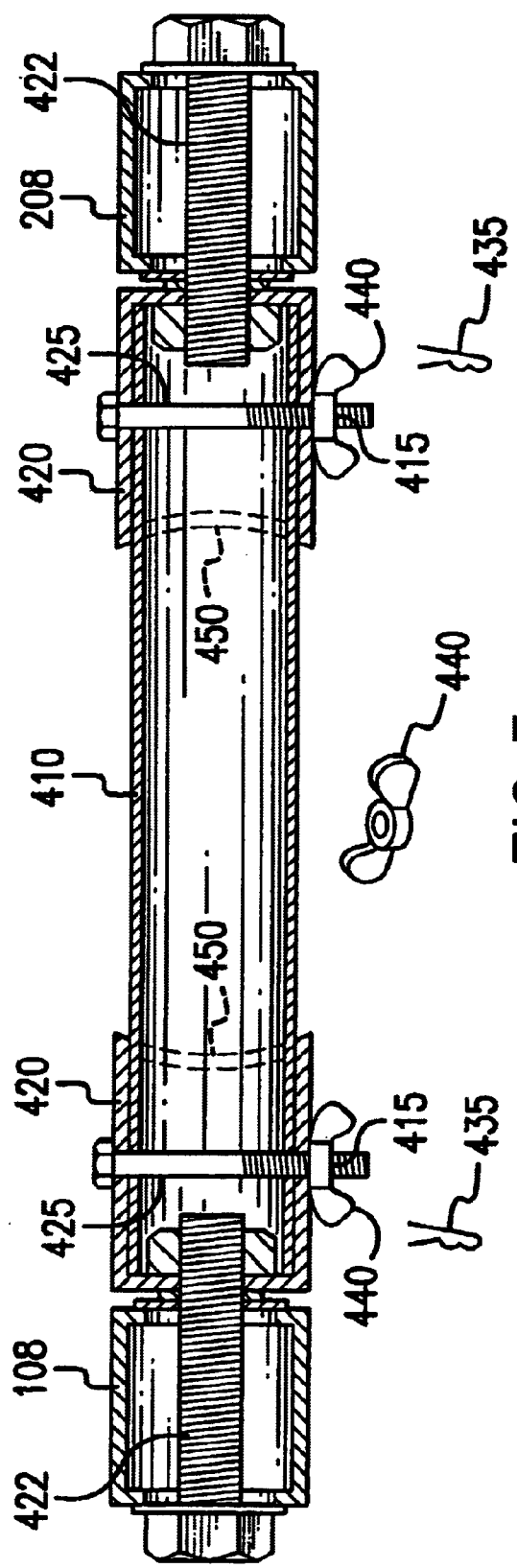

CONVERTIBLE BICYCLE

FIELD OF THE INVENTION

The invention relates to a device for coupling two separate bicycles to one another in a side-by-side relationship.

BACKGROUND OF THE INVENTION

The ability to couple two bicycles in a side-by-side relationship allows two people to enjoy bicycle riding together. In the side-by-side relationship, each occupant has a clear view of the terrain ahead and therefore has the advantage over a single bicycle provided with two seats where one occupant is behind the other. In this instance, the second occupant has the majority of the scenery ahead of the bicycle blocked by the occupant in front.

Once the two bicycles are connected in the side-by-side relationship, the joined bicycles enjoy great stability based on the four tires spaced at the corners of the joined bicycle.

Several prior art devices disclose ways of connecting two bicycles to one another in a side-by-side relationship. One such device is disclosed in U.S. Pat. No. 3,865,401 (Kingsly) Kingsly discloses bicycles joined by several connectors, each connector having end portions threadedly engaging a threaded shaft. The connection of each end of the connectors to the bicycle needs to be removed in order to disengage the two bikes from one another.

U.S. Pat. No. 5,511,809 (Sagi) discloses two bicycles connected by horizontal bars having opposite clamp members to attach the bars to the bicycles. The two-rider, four-wheel vehicle has a differential axle, an intermediate driving shaft and a unified brake system.

There is a need in the prior art for a system for connecting two separate bicycles to one another in a side-by-side relationship and being possible to quickly disengage the bicycles from one another.

It is an object of the invention to provide a system for quickly and easily connecting and coupling and decoupling two bicycles to one another.

It is another object of the invention to provide a system for rigidly connecting two bicycles to one another in a side-by-side relationship.

It is yet another object of the invention to provide a system for connecting two bicycles in a side-by-side relationship utilizing a minimum number of parts that quickly and easily assemble and disassemble.

These and other objects of the invention will become apparent after reading the disclosure of the invention.

SUMMARY OF THE INVENTION

A device for connecting two bicycles to one another in a side-by-side relationship allows two riders to simultaneously use the bicycle and not have the view blocked by a rider directly in front of them. A steering bar insures that the front wheels of both bicycles are always pointed in the same direction so that, when connected, the joined bicycles both head in the same direction. Additional bars are connected between the two bicycles to provide a rigid connection between the bicycles. The rigid connection insures that both bicycles travel at the same speed. If one rider causes one of the bicycles to move faster, the acceleration and speed of the first bicycle will be transferred to the second bicycle due to the rigid connection. For all intents and purposes, when joined, the two bicycles act as a single vehicle. The connection between the bicycles can be easily disassembled so that each bicycle can be used separately. The flexibility of using both bicycles separately or together is advantageous in such situations as bicycle rentals. Bicycles can be joined or separated as the demand dictates.

BRIEF DESCRIPTION OF THE DRAWINGS

FIG. 3 is a cross-sectional view of the front bar assembly;

DETAILED DESCRIPTION OF THE INVENTION

Figure 1:
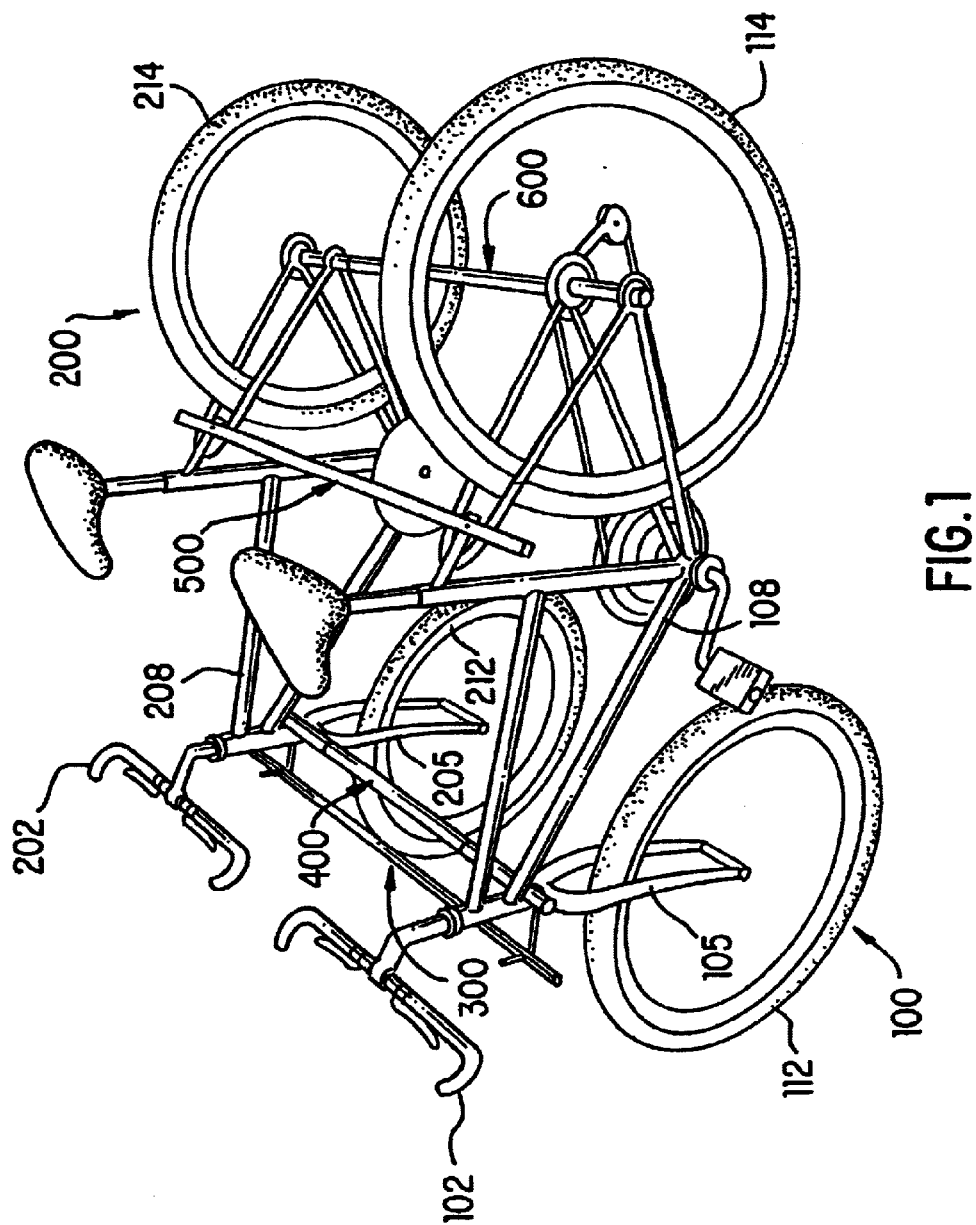
FIG. 1 is a perspective view of two bicycles joined in a side-by-side relationship.

The device of the invention can be seen in FIG. 1 where a first bicycle 100 has been joined to a second bicycle 200 by connecting a steering bar assembly 300, a front bar assembly 400, a middle bar assembly 500 and a rear bar assembly 600 between the two bicycles. Once joined, the two bicycles will travel as a single unit in both speed and direction.

Figure 2:
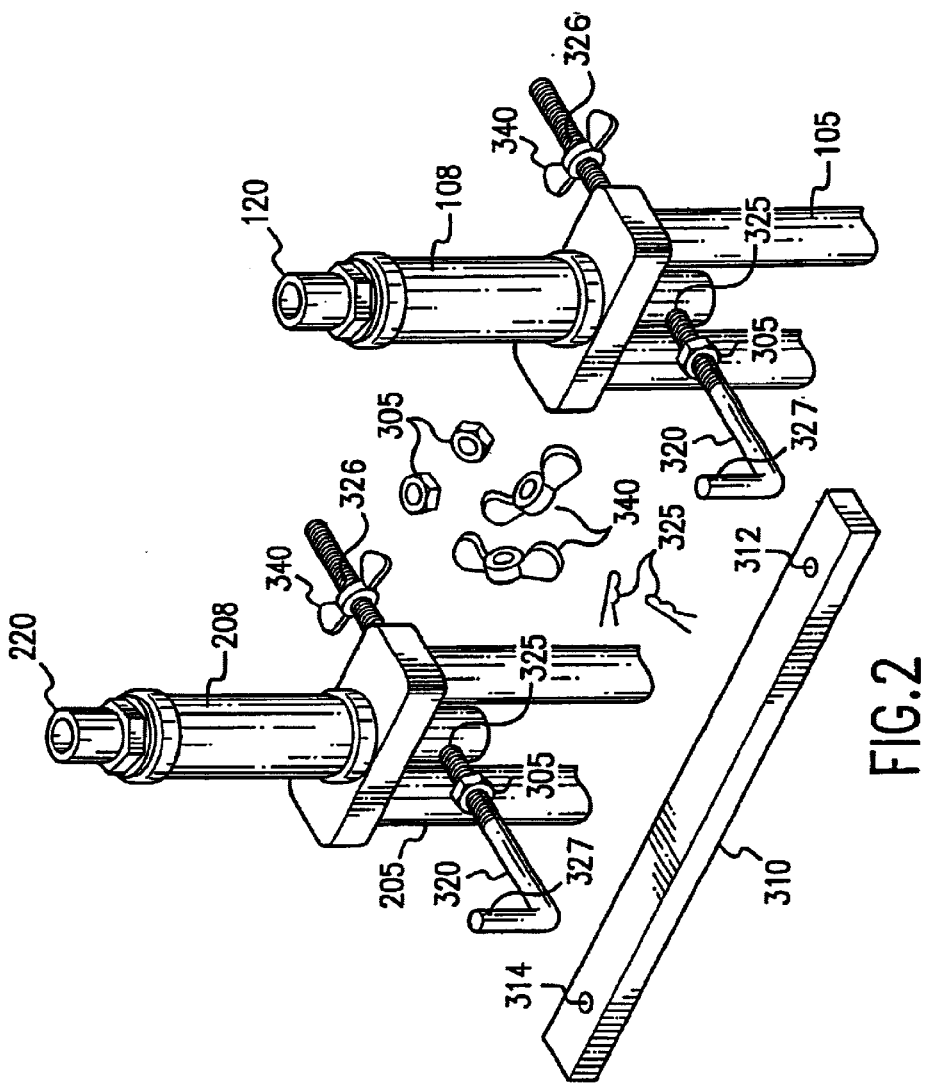
FIG. 2 is an exploded view of the steering bar assembly.
Figure 2A:
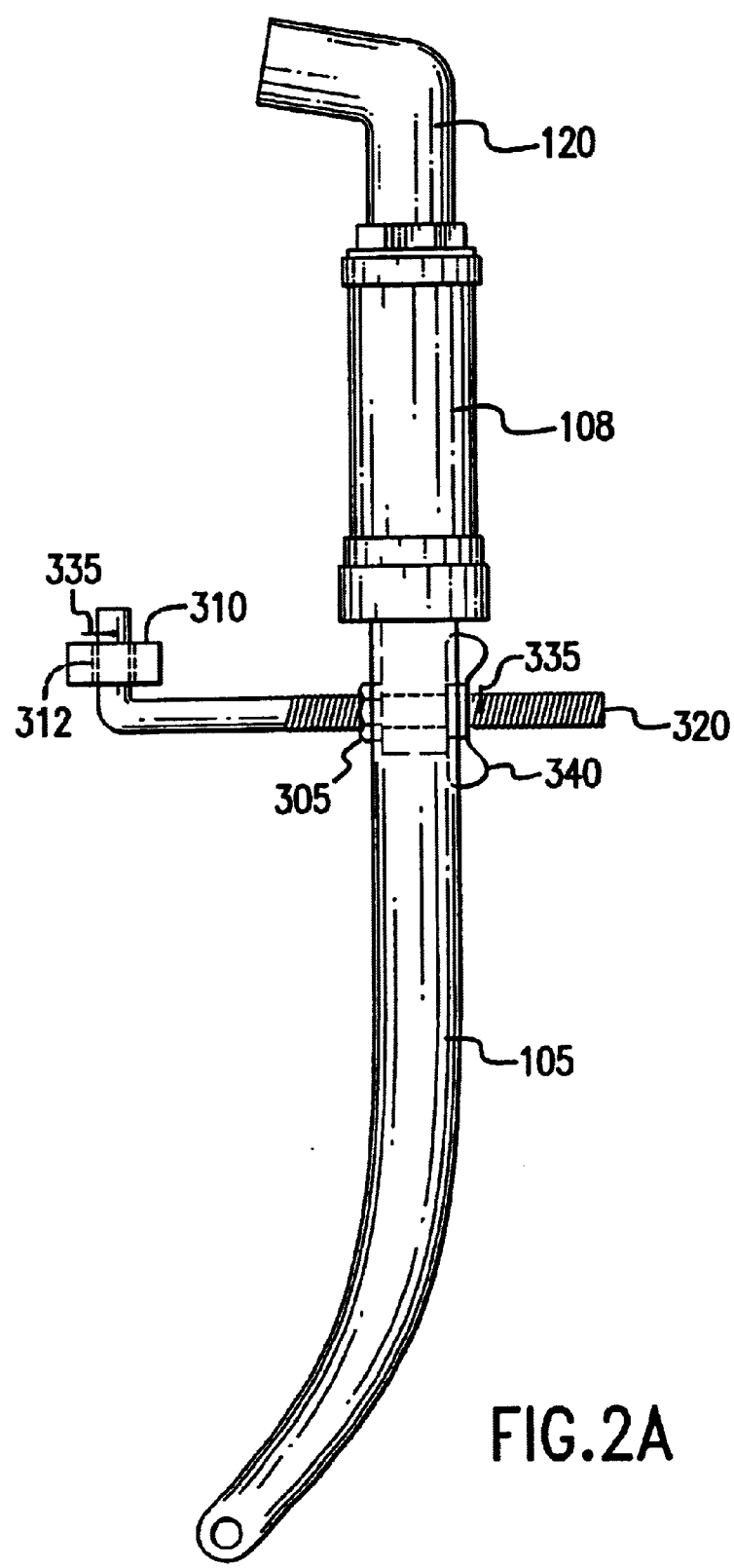
FIG. 2a is a side view of the steering bar assembly.

The steering bar assembly can be seen in FIG. 2. Each bicycle has a goose neck 120, 220 for connecting the handle bars 102, 202 to the front fork 105, 205. Each fork is connected to a front wheel 112, 212. The goose neck 120, 220 passes through the frame 108, 208 of each bicycle and, by connecting the handle bars to the goose necks which then attach to the forks, allow the rider to steer the bicycle.

The L-shaped steering rod 320 pass through an aperture 325 in the goose neck 120, 220. The steering bar 310 is connected to the steering rods 320 by having the steering rods 320 pass through a pair of aperture 312, 314 in the steering bar 310 and passing a pin through front apertures 327. The steering rods keep the steering bar 310 spaced forwardly from the forks 105, 205 of the bicycle to allow for the arcuate path of motion that the steering bar will have as the riders steer the bicycle. This arcuate path of motion also changes the angle between the steering bar and steering rods. For that reason, the connection must allow for a pivoting motion between the steering rod and steering bar.

The section of the steering rods on both sides of the goose necks are threaded. A lock nut 305 is threaded onto the steering rod before the steering rod is inserted through the aperture 325 in the lower end of the goose necks 120, 220. In this way, the lock nut acts as a stop. After the steering rod is inserted through the aperture, wing nuts 340 are threaded onto the steering rod to retain the steering in a fixed position relative to the goose neck. Rear apertures 326 are provided on the steering rods and push pin 328 is inserted through the rear aperture 326 and held in place by the resilience to secure the steering rod firmly and prevent disengagement during use.

A cross-sectional view of the front bar assembly 400 is shown in FIG. 3. A hub 420 is secured to each bicycle frame 108, 208 by a bolt 422. One end of the hub 420 is open, allowing for the tightening and loosening of the hub. Once secured to the bicycle frame 108, 208, the hubs secure a front bar 410. The front bar is inserted into each of the hubs and apertures in both the hubs 420 and the front bar 410 are aligned. Once aligned, a bolt 425 is inserted through the holes to secure the front bar to the hubs. To secure the bolt in place, a nut, such as a wing nut 440, is threaded onto the bolt. A push pin 435 can be inserted through an aperture 415 in the bolt 425 to prevent the accidental backing-off of the wing nut 440. The front hubs may have an arc shaped edge 450 to allow for elevation deviation adjustment.

Figure 4:
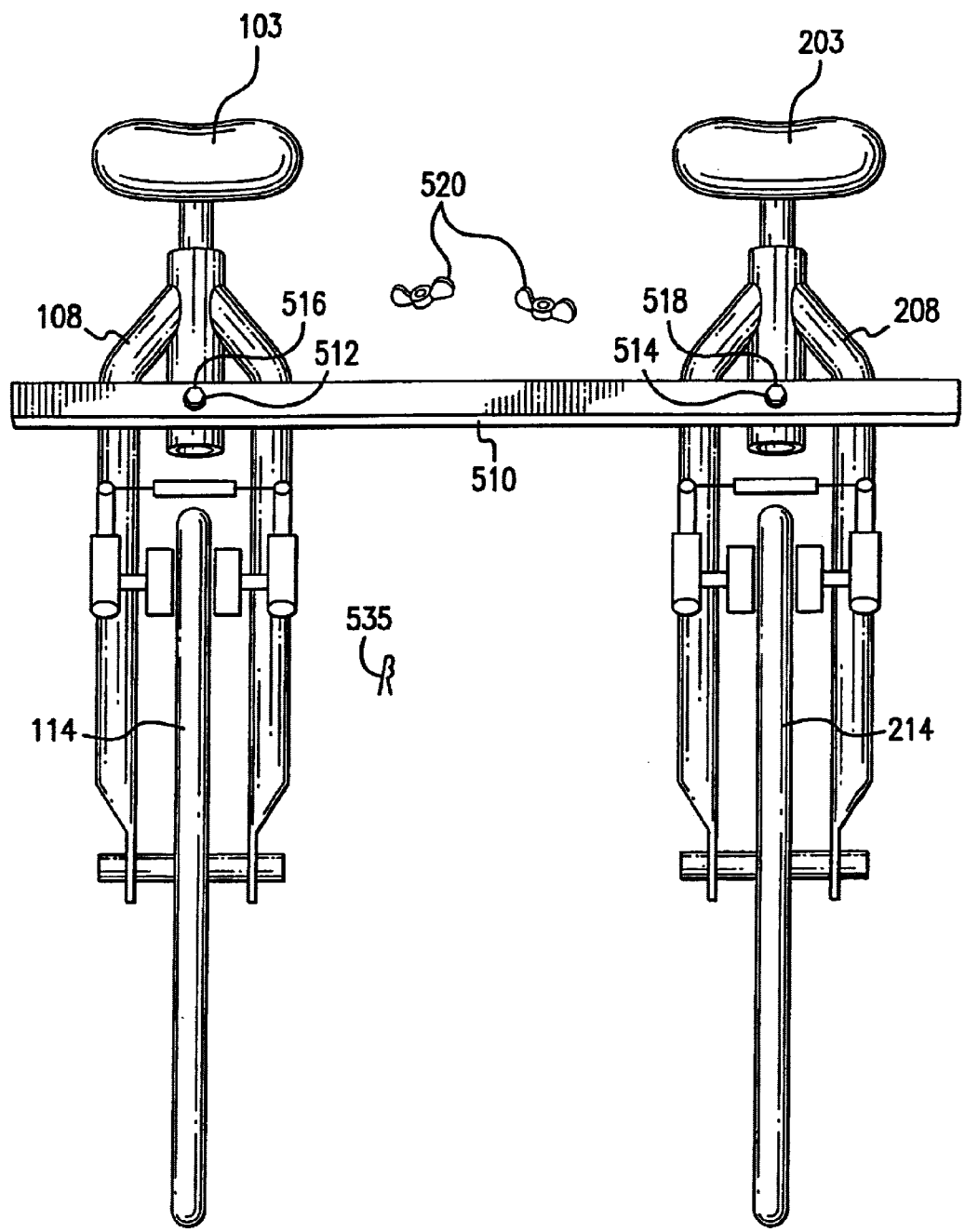
FIG. 4 is a rear view of the middle bar assembly.

The middle bar assembly can be seen in FIG. 4. The middle bar is attached to the frames 108, 208 of the bicycles rearwardly of the seat. The middle bar 510 is secured to each frame 108, 208 by having a pair of apertures 512, 514 receiving a bolt 516, 518 which extends through an aperture in the frame. The bolt is secured in place by the wing nut 520 and push pin 535 arrangement utilized with the front bar. The middle bar assembly provides rigidity to the connected bicycles to insure that they move as a single unit.

Figure 5:
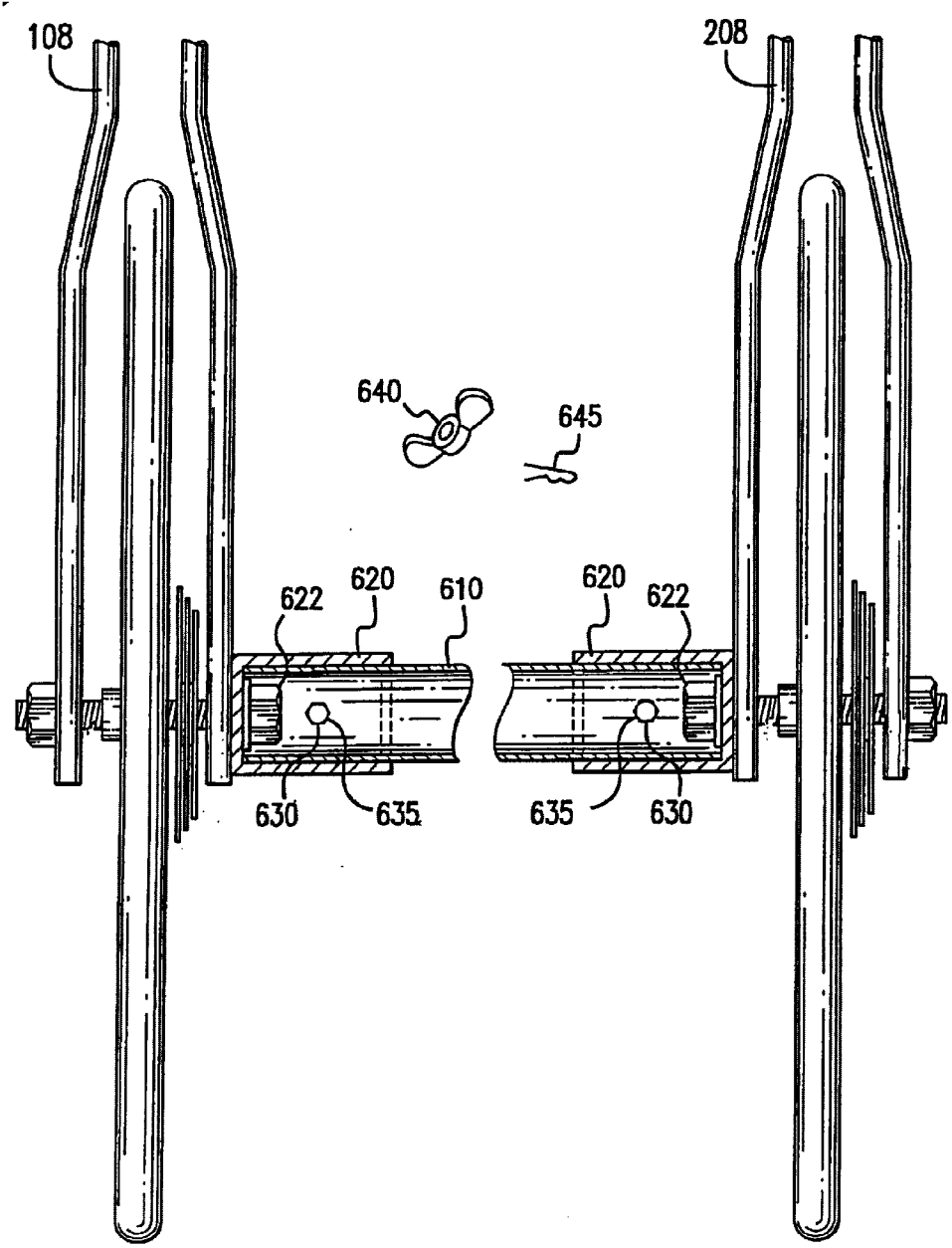
FIG. 5 is a cross-sectional view of the rear bar assembly.

The rear support bar assembly is shown in the cross-sectional view of FIG. 5. similar to the arrangement of the front bar assembly, a pair of hubs 620 are secured to the frames attached to the frame by a bolt 62 that also secures the rear tire/wheel axles 114, 214 to the frames. Once the hubs are securely attached to the frames, a rear bar 610 is placed within each. Similar to the front bar assembly, apertures in the hubs 635 and rear bar 610 are aligned and a bolt 630 passes through the apertures to secure the rear support bar to the hubs with nut 640 and cotter pin 645, as describe earlier. The bolt is again secured in place by the wing nut and push pin assembly.

When it is desired to separate the two bicycles, the bolts securing the front bar 410 and rear bar 610 to the hubs are disconnected by removing the wing nuts and push pins that retain them. The hubs themselves can remain in place as they do not impede the use of the single bicycle. This reduces the time and effort involved in coupling and decoupling two bicycles together. This feature is particularly advantageous in the commercial bike rental business where bikes can be coupled and decoupled as demand dictates. The middle bar can be lifted from the two bicycles by removing the two push pins, wing nuts and bolts, attaching them to the frame. Lastly, the steering bar assembly can be decoupled by removing the two push pins at the end of the steering rods that are forward of the bicycle frame. The steering bar may then be lifted off the steering rods. The steering rods may be left in place as they do not impede the operation of the single bicycles. Once the bolts are removed from all hubs and the middle support bar and steering bar are removed, separating the two bicycles by about twelve inches will free the front support bar and rear support bar from the hubs. In a quick and efficient manner, the bicycles can be decoupled.

While the invention has been described with reference to a preferred embodiment, modifications and variations would be apparent to one of ordinary skill in the art. The invention encompasses such modifications and variations that do not depart from the scope of the invention.

I claim:

1. A pedal powered vehicle, comprising:
    a first bicycle, said first bicycle having a frame, a front tire attached to said frame and a back tire attached to said frame, handle bars attached to said front tire, said handle bars having a neck extending through and rotatably retained by said frame, said neck having an aperture
    a second bicycle, said second bicycle having a frame, a front tire attached to aid frame and a back tire attached to said frame, handle bars attached to said front tire, said handle bars having a neck extending through and rotatably retained by said frame, said neck having an aperture,
    a pair of steering rods, each steering rod having a first section extending forward an a second section extending upwardly, said first section extending through said apertures in said handle bar necks,
    a steering bar spaced from said first and second bicycle frames,
    said steering bar having two apertures, said steering bar connected to said steering rods by said second section of each steering rod extending upwardly into said apertures.

2. The vehicle of claim 1, wherein said second section of each steering rod extends above said steering bar, said steering bar secured to said steering rod by push pins retained in apertures in said steering rods.

3. The vehicle of claim 1, further comprising:
    a first hub attached to said first bicycle frame,
    a second hub attached to said second bicycle frame,
    a front bar connected to said first hub and said second hub wherein said front bar telescopically fits with said first hub and said second hub, and a pin extends through each of said first and second hub and front bar to retain said bar to each said hub.

4. The vehicle of claim 3, further comprising:
    a third hub connected to said first bicycle rear tire axle,
    a fourth hub connected to said second bicycle rear tire axle,
    a rear bar connected to said third hub and said fourth hub wherein said rear bar telescopically fits with said third hub and said fourth hub, and a pin extends through each of said third and fourth hub and rear bar to retain said rear bar to each said hub.

5. The vehicle of claim 4, wherein said third hub is connected to said first bicycle rear tire axle by a first bolt, said first bolt connecting said first bicycle rear tire to said first bicycle frame,
    said fourth hub is connected to said second bicycle rear tire axle by a second bolt, said second bolt connecting said second bicycle rear tire axle to said second bicycle frame.

6. A pedal powered vehicle, comprising:
    a first bicycle, said first bicycle having a frame, a front tire attached to said frame and a back tire attached to said frame, handle bars attached to said front tire, said handle bars rotatably held by said frame,
    a second bicycle, said second bicycle having a frame, a front tire attached to said frame and a back tire attached to said frame, handle bars attached to said front tire, said handle bars rotatably held by said frame,
    a first hub attached to said first bicycle frame,
    a second hub attached to said second bicycle frame,
    a bar having a first end and a second end, said first end telescopically fitting with said first hub and said second end telescopically fitting with said second hub,
    said bar retained to aid hubs by a pin extending through each hub and bar.

7. The vehicle of claim 6, wherein said pin is a threaded fastener.

8. The vehicle of claim 6, wherein said bar is a front bar.

9. The vehicle of claim 6, wherein said bar is a rear bar and said hubs are attached to the rear tire of said first and second bicycle.

10. The vehicle of claim 6, wherein said bar fits within said first and second hub.

\* \* \* \* \*